(12) United States Patent
Theriault et al.

(10) Patent No.: US 8,696,024 B2
(45) Date of Patent: Apr. 15, 2014

(54) COUPLER FOR A VEHICLE AND A VEHICLE COMPRISING SAME

(75) Inventors: Denis Theriault, St-Pascal (CA); Patrick Fortin, Thetford-Mines (CA)

(73) Assignee: LA Compagnie Normand LTEE, Saint-Pascal (CA)

( * ) Notice: Subject to any disclaimer, the term of this patent is extended or adjusted under 35 U.S.C. 154(b) by 0 days.

(21) Appl. No.: 13/594,119

(22) Filed: Aug. 24, 2012

(65) Prior Publication Data

US 2013/0214519 A1    Aug. 22, 2013

Related U.S. Application Data

(60) Provisional application No. 61/568,413, filed on Dec. 8, 2011.

(51) Int. Cl.
*B60R 19/54*    (2006.01)

(52) U.S. Cl.
USPC .......................................................... 280/762

(58) Field of Classification Search
None
See application file for complete search history.

(56) References Cited

U.S. PATENT DOCUMENTS

| | | | |
|---|---|---|---|
| 3,091,352 A | 5/1963 | Vitable | |
| 3,151,885 A | 10/1964 | Johnson | |
| 3,659,362 A | 5/1972 | Bell | |
| 4,178,011 A | 12/1979 | Kirsch | |
| 4,778,195 A | 10/1988 | Vachon | |
| 4,899,831 A | 2/1990 | Schillings et al. | |
| 5,040,615 A | 8/1991 | Fletcher | |
| 5,240,085 A | 8/1993 | Klossner et al. | |
| 5,974,702 A | 11/1999 | Donoghue | |
| 6,074,120 A * | 6/2000 | Williams | 403/326 |
| 6,178,669 B1 | 1/2001 | Quenzi et al. | |
| 7,627,965 B2 * | 12/2009 | Schmeichel | 37/266 |
| 7,676,964 B2 * | 3/2010 | Schmeichel | 37/268 |
| 7,707,753 B2 * | 5/2010 | Schmeichel | 37/231 |
| 7,735,245 B2 * | 6/2010 | Schmeichel | 37/231 |
| 7,735,247 B2 * | 6/2010 | Schmeichel | 37/270 |
| 7,984,575 B2 * | 7/2011 | Robl et al. | 37/468 |
| 8,069,590 B2 * | 12/2011 | Schmeichel | 37/232 |
| 2001/0022226 A1 | 9/2001 | Staude | |
| 2001/0047600 A1 | 12/2001 | Quenzi et al. | |
| 2002/0088149 A1 | 7/2002 | Quenzi et al. | |
| 2004/0079224 A1 | 4/2004 | Bernhardt et al. | |
| 2004/0140109 A1 | 7/2004 | Schlesser et al. | |
| 2006/0016611 A1 | 1/2006 | Chauvel | |
| 2008/0211216 A1 | 9/2008 | Fortin | |

FOREIGN PATENT DOCUMENTS

| | | |
|---|---|---|
| DE | 23 33 141 A1 | 1/1975 |
| FR | 1147442 | 6/1957 |
| WO | 2011050460 A1 | 5/2011 |

\* cited by examiner

*Primary Examiner* — John Walters
*Assistant Examiner* — James Triggs
(74) *Attorney, Agent, or Firm* — Wiley Rein LLP

(57) ABSTRACT

A coupler for securing an accessory to a motorized vehicle and comprising an accessory attachment component securable to the accessory and a coupler frame securable to the vehicle. The accessory attachment component includes an accessory pivotal connector and an accessory positioning connector. The coupler frame has a coupler pivotal support defined in the coupler frame configured to receive and pivotally support the accessory pivotal connector and a coupler positioning support configured to receive and guide the accessory positioning connector in a coupled configuration. The accessory positioning connector is aligned with the coupler positioning support when the accessory pivotal connector is received in the coupler pivotal support and slidable toward the coupled configuration. The coupler further comprises a locking mechanism engageable with the accessory attachment component and the coupler frame to lock the accessory attachment component and the coupler frame in the coupled configuration.

26 Claims, 12 Drawing Sheets

COUPLER FOR A VEHICLE AND A VEHICLE COMPRISING SAME

CROSS-REFERENCE TO RELATED APPLICATIONS

This application claims priority under 35 USC §119(e) of U.S. provisional patent application 61/568,413 filed on Dec. 8, 2011, the specification of which is hereby incorporated by reference.

FIELD OF THE INVENTION

The present invention relates to a coupler for a vehicle. More particularly, the present invention relates to a coupler for coupling an accessory to a vehicle and to a vehicle comprising same.

BACKGROUND OF THE INVENTION

Known in the art are coupler structures for attaching various accessories to the front or back of a vehicle and, more particularly, a motorized vehicle. Most front couplers provide a three-point connection which as a consequence makes it difficult to mount an accessory thereon. Indeed, in order to attach an accessory on a three-point connecting coupler, the user must usually simultaneously align all three connecting points with corresponding connecting points of the accessory in order to attach the accessory onto the coupler.

Known to the applicant is U.S. Pat. No. 5,240,085, which teaches a front coupler for a tractor. The coupler has a pair of vertical plates 50 and 60, each having at their upper end a slot 60 for receiving corresponding pins 66 of the implement 14, as well as lower spring loaded pins 64 adapted to fit with openings provided in the vertical mounting plate 68 of the implement 14. In order to attach the implement to the coupler 12, the slots 60 are seated beneath the pins 66 of the implement 14 and the lower portion of the coupler 12 is then rotated forwardly about the pins 66 to snap the spring loaded pins 64 into corresponding openings provided by the implement 14. Thus, the coupler must be moved around the implement 14, which requires the coupler to be articulated accordingly. Thus, in order to mount the implement 14 onto the coupler 12, an operator is required to position the implement 14, to move the coupler 12 to position the slots 60 beneath the pins 66 and to rotate the coupler into position, which include elaborate and awkward steps. Moreover, the coupler must be articulated so as to be movable when mounted on the vehicle (rotation about pins 66, etc.). Furthermore, the implement 14 requires spring loaded pins 64. Without such spring loaded pins 64, the coupling will require an additional step of aligning the implement with respect to the coupler in order to lock it in place.

Hence, in light of the aforementioned, there is a need for an improved coupler which, by virtue of its design and components, would be able to overcome some of the above-discussed prior art concerns.

SUMMARY OF THE INVENTION

According to a first general aspect, there is provided a coupler for coupling an accessory to a vehicle. The accessory comprises an attachment component detachably engageable with the coupler. The attachment component comprises an accessory alignment structure, an accessory pivotal connector, and an accessory positioning connector. The coupler comprises a mounting assembly for mounting the coupler to the vehicle and a coupler frame operatively connected to the mounting assembly and having a free end to receive the accessory. The coupler frame comprises a coupler alignment structure for cooperating with the accessory alignment structure, so as to align the accessory with respect to the coupler frame; a coupler pivotal support formed therein for receiving and supporting the accessory pivotal connector, so as to pivotally support the attachment component of the accessory onto the coupler frame; a coupler positioning support formed therein for receiving the accessory positioning connector, so as to position the attachment component of the accessory and the coupler in a coupled configuration; and a locking mechanism for cooperating with the coupler positioning support of the coupler frame to lock the accessory positioning connector in the coupled configuration.

According to another general aspect, there is provided a coupler for coupling an accessory to a vehicle. The accessory includes an attachment component to be mounted on the coupler, the attachment component having a pair of upper male members extending on opposite sides of the attachment component in an upper section thereof and a pair of lower male members extending on opposite sides of the attachment component in a lower section thereof. The coupler comprises a mounting assembly for mounting the coupler to the vehicle; and a pair of attachment plates being operatively connected to the mounting assembly. The attachment plates are spaced apart for alignment with the pairs of upper and lower male members of the attachment component, for engaging the accessory with the attachment plates at a free end thereof. Each of the attachment plates comprises a groove provided in an upper section of the attachment plates and being open upwardly for receiving and supporting therein a corresponding one of the pair of upper male members of the accessory. Each of the attachment plates further comprises a slot being provided below the groove at the free end, for sliding therein a corresponding one of the pair of lower male members of the accessory. The coupler further comprises a locking mechanism for cooperating with the slot to lock the lower male members in the slot, and thereby couple the attachment component of the accessory to the attachment plates of the coupler.

According to another general aspect, there is provided a coupler for coupling an accessory to a vehicle, wherein the accessory has an attachment component to be mounted on the coupler, the attachment component having a pair of plates being spaced apart from one another. Each of the plates has an upper attachment component and a lower attachment component below the upper attachment component. The coupler further comprises a mounting assembly for mounting the coupler to the vehicle; and a coupler frame being operatively connected to the mounting assembly. The coupler frame has a free end to attach the accessory. The coupler frame comprises coupler attachment plates being configured substantially vertically and being spaced apart in alignment with the pair of plates of the attachment component of the accessory to fittingly engage with the pair of plates of the attachment component so as to align the accessory with respect to the coupler frame. The coupler frame further comprises a groove being formed in an upper section of the coupler attachment plates and being open upwardly for receiving and supporting therein the upper component of the attachment component of the accessory so as to pivotally support the attachment component onto the coupler frame. The coupler attachment plates further comprise a slot being provided below the groove at the free end of the coupler attachment plates, for sliding therein the lower component of the attachment component of the accessory, so as to position the attachment component of the accessory with respect to the coupler. The coupler frame further comprises a locking mechanism for cooperating with the slot to lock the lower component in the slot, and thereby couple the attachment component of the accessory to the coupler frame.

According to yet another general aspect, there is provided a coupler for coupling an accessory to a vehicle, the accessory having an attachment component to be mounted on the coupler. The attachment component has an accessory alignment structure, an accessory pivotal connector and an accessory positioning connector. The coupler comprises: a mounting assembly for mounting the coupler to the vehicle; and a coupler frame being operatively connected to the mounting assembly, the coupler frame having a free end to receive the accessory. The coupler frame comprises: a coupler alignment structure to cooperate with the accessory alignment structure, so as to align the accessory with respect to the coupler frame; a coupler pivotal support provided in the coupler frame for receiving and supporting therein the accessory pivotal connector, so as to pivotally support the attachment component onto the coupler frame; a guide being formed in the coupler frame, for guiding the accessory positioning connector toward a coupled configuration; and a locking mechanism for cooperating between the accessory and the coupler to lock the positioning connector in the coupled configuration, and thereby couple the attachment component of the accessory to the coupler frame.

According to yet another general aspect, there is provided a vehicle comprising: an accessory coupler operatively mounted at an end of the vehicle and including two spaced-apart plates, each one of the plates having an open-end upper groove and an open-end lower slot; an accessory detachably engageable with the accessory coupler having at least one upper male member and at least one lower male member respectively engageable in the open-end upper grooves and the open-end lower slots; and at least one of the accessory coupler and the accessory further comprising a locking mechanism for securing the accessory to the accessory coupler when the accessory is engaged with the accessory coupler.

According to yet another general aspect, there is provided a method of coupling an accessory having an attachment component, to a vehicle comprising a coupler. The method comprises steps of: (a) fittingly engaging an alignment structure of the accessory with a coupler frame, in order to align the accessory with respect to the coupler frame; (b) dropping a pivotal connector of the accessory into a pivotal support being formed in the coupler frame, the pivotal support being open upwardly, so as to nest and pivotally support the attachment component onto the coupler frame; (c) rotating the attachment component about the pivotal connector to slide a positioning connector of the accessory into a positioning support being formed in the coupler frame, in order to position the attachment component of the accessory with respect to the coupler; (d) and locking the positioning connector in a coupled configuration in the positioning support, in order to couple the attachment component of the accessory to the coupler frame.

In an embodiment, steps (a) and (b) are performed simultaneously.

According to yet another general aspect, there is provided a method of coupling an accessory having an attachment component, to a vehicle comprising a coupler. The method comprises steps of: (a) fittingly engaging an alignment structure of the accessory with a coupler frame, in order to align the accessory with respect to the coupler frame; (b) receiving a pivotal connector of the accessory in a pivotal support being formed in the coupler frame, the pivotal support being open upwardly, so as to nest and pivotally support therein the attachment component onto the coupler frame; (c) guiding a positioning connector of the accessory by means of a guide, in order to guide the positioning connector into a coupled configuration with respect to the coupler; and (d) locking the positioning connector to secure the positioning connector in the coupled configuration, in order to couple the attachment component of the accessory to the coupler frame.

According to yet another general aspect, there is provided a vehicle comprising: an accessory coupler operatively mounted at an end of the vehicle and including two spaced-apart coupler attachment plates, each one of the coupler attachment plates having a downwardly extending upper groove with an open end and an elongated guide member; an accessory detachably engageable with the accessory coupler and having at least one upper male member and at least one lower male member respectively engageable in the upper grooves and the elongated guide members to configure the accessory and the accessory coupler in a coupled configuration, the at least one lower male member being engageable in the elongated guide member and slidable therein toward the coupled configuration; and a locking mechanism for securing the accessory and the accessory coupler together when the accessory is engaged with the accessory coupler in the coupled configuration.

According to yet another general aspect, there is provided a coupler for coupling an accessory to a vehicle. The accessory comprises an attachment component to be mounted to the coupler. The attachment component comprises an accessory alignment structure, an accessory pivotal connector, and an accessory positioning connector. The coupler comprises: a mounting assembly securable to the vehicle; and a coupler frame operatively connected to the mounting assembly and having a free end to receive the accessory. The coupler frame comprises: a coupler alignment structure for cooperating with the accessory alignment structure of the attachment component, so as to align the accessory with respect to the coupler frame; a coupler pivotal support formed therein configured to receive and pivotally support the accessory pivotal connector of the attachment component; a coupler positioning support formed therein configured to receive the accessory positioning connector of the attachment component and guide the accessory positioning connector toward a coupled configuration, wherein the accessory positioning connector is aligned with the coupler positioning support when the accessory pivotal connector is received in the coupler pivotal support; and a locking mechanism engageable with the attachment component of the accessory and the coupler frame to lock the accessory and the coupler frame in the coupled configuration.

According to yet another general aspect, there is provided a coupler for securing an accessory to a motorized vehicle. The coupler comprises: an accessory attachment component securable to the accessory and including an accessory pivotal connector and an accessory positioning connector; a coupler frame securable to the vehicle and having a coupler pivotal support defined in the coupler frame configured to receive and pivotally support the accessory pivotal connector and a coupler positioning support configured to receive and guide the accessory positioning connector in a coupled configuration, wherein the accessory positioning connector is aligned with the coupler positioning support when the accessory pivotal connector is received in the coupler pivotal support and slidable toward the coupled configuration; and a locking mechanism engageable with the accessory attachment component and the coupler frame to lock the accessory attachment component and the coupler frame in the coupled configuration.

The objects, advantages and features of the present invention will become more apparent upon reading of the following non-restrictive description of embodiments thereof, given for the purpose of exemplification only, with reference to the accompanying drawings.

DETAILED DESCRIPTION

Figure 1:
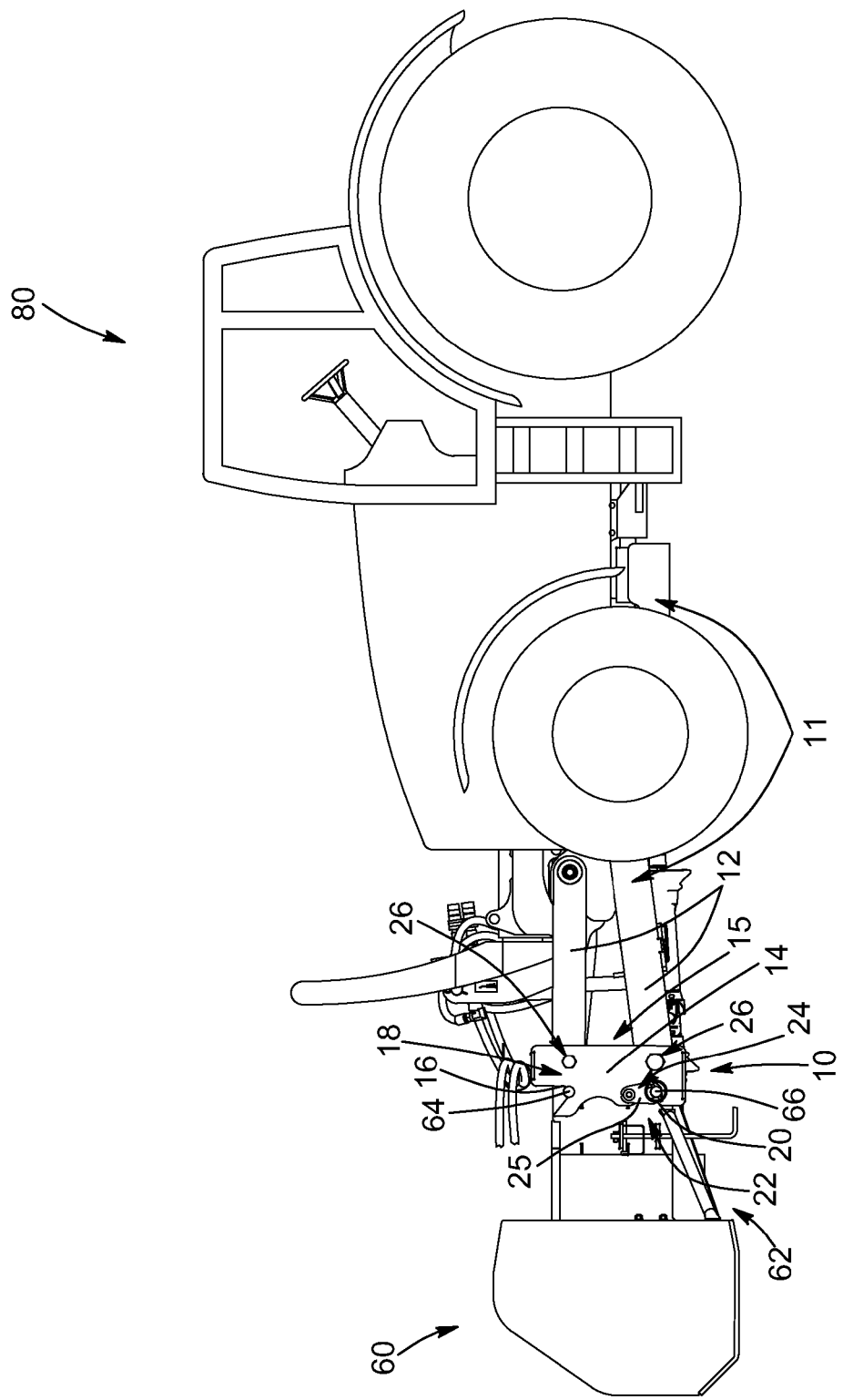
FIG. 1 is a side elevation view of a coupler in combination with an accessory according to an embodiment where the coupler is mounted on a vehicle.

In the following description, the same numerical references refer to similar elements. The embodiments, geometrical configurations, materials mentioned and/or dimensions shown in the figures or described in the present description are embodiments only, given solely for exemplification purposes.

Moreover, although one embodiment of the present invention as illustrated in the accompanying drawings comprises components such as an attachment plate on the frame of the coupler, upper and lower pairs of male members on the accessory, etc., and although the embodiment of the coupler and corresponding parts thereof consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations therebetween, as well as other suitable geometrical configurations may be used for the coupler according to the present invention, as will be briefly explained herein and as can be easily inferred herefrom, by a person skilled in the art, without departing from the scope of the invention.

Furthermore, the order of the steps of the method described herein should not be taken as to limit the scope of the invention, as the sequence and timing of the steps may vary in a number of ways, without affecting the scope or working of the invention, as can also be understood.

Broadly described, the coupler 10, as exemplified in the accompanying drawings, facilitates the mounting of an accessory 60 to a vehicle 80, such as a motorized vehicle, by aligning, positioning and engaging the accessory 60 with respect to the coupler 10. In the embodiment shown, the motorized vehicle 80 is a tractor; however, the coupler 10 can be used with other vehicles, motorized or not, such as and without being limitative a pick-up truck.

In the illustrated embodiment, the coupler 10 is a front coupler adapted to couple the accessory 60 to a front portion of the vehicle 80. However in an alternative embodiment, the coupler may be adapted to couple the accessory 60 to a rear portion of the vehicle 80.

In an embodiment and as better illustrated in FIGS. 1 to 6, there is provided a coupler 10 for coupling an accessory 60 to a vehicle 80. The coupler 10 includes a mounting assembly 11 for mounting the coupler 10 to the vehicle 80, which will be described in more details below, and a frame 15 having a pair of coupler attachment plates 14, which are configured substantially vertically and are spaced apart from one another. The frame 15, including the coupler attachment plates 14, is operatively connected to the mounting assembly 11 and is designed to engage an attachment component 62 of the accessory 60, as it will be described in more details below.

Figure 9:
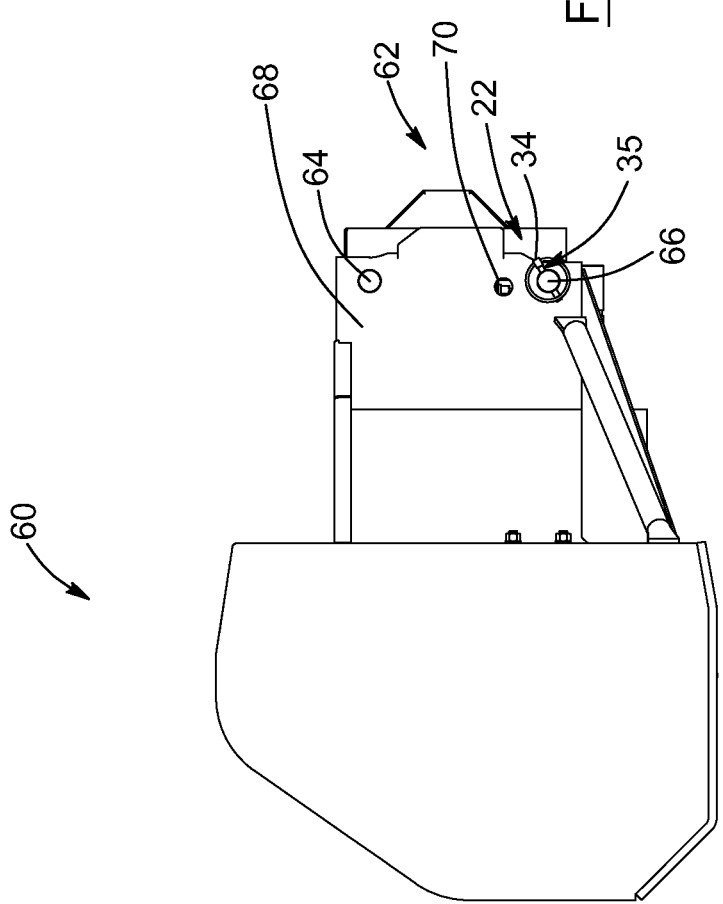
FIG. 9 is a side elevation view of the accessory shown in FIG. 1, according to an embodiment.
Figure 10:
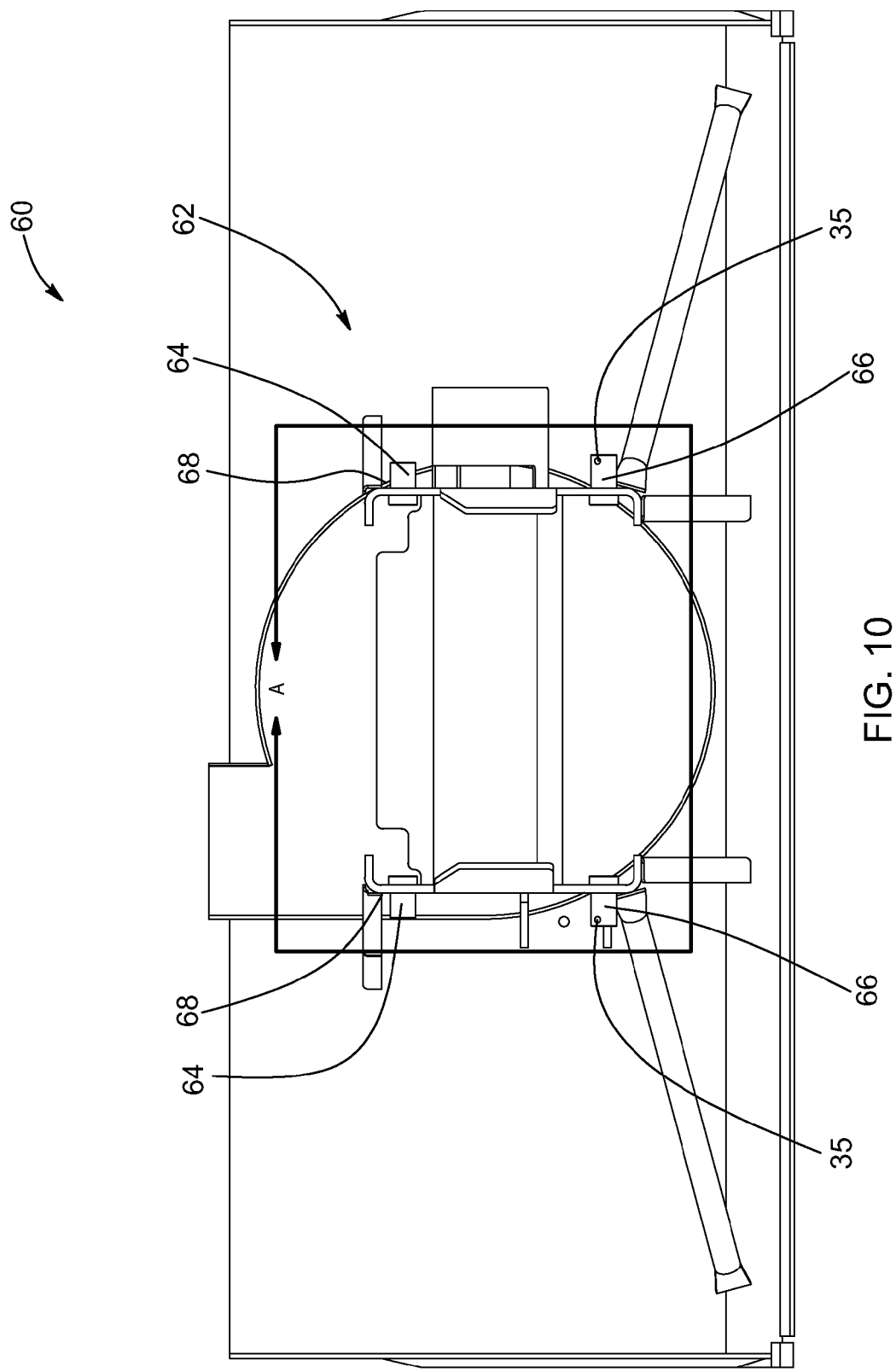
FIG. 10 is a rear elevation view of the accessory of FIG. 9.
Figure 11:
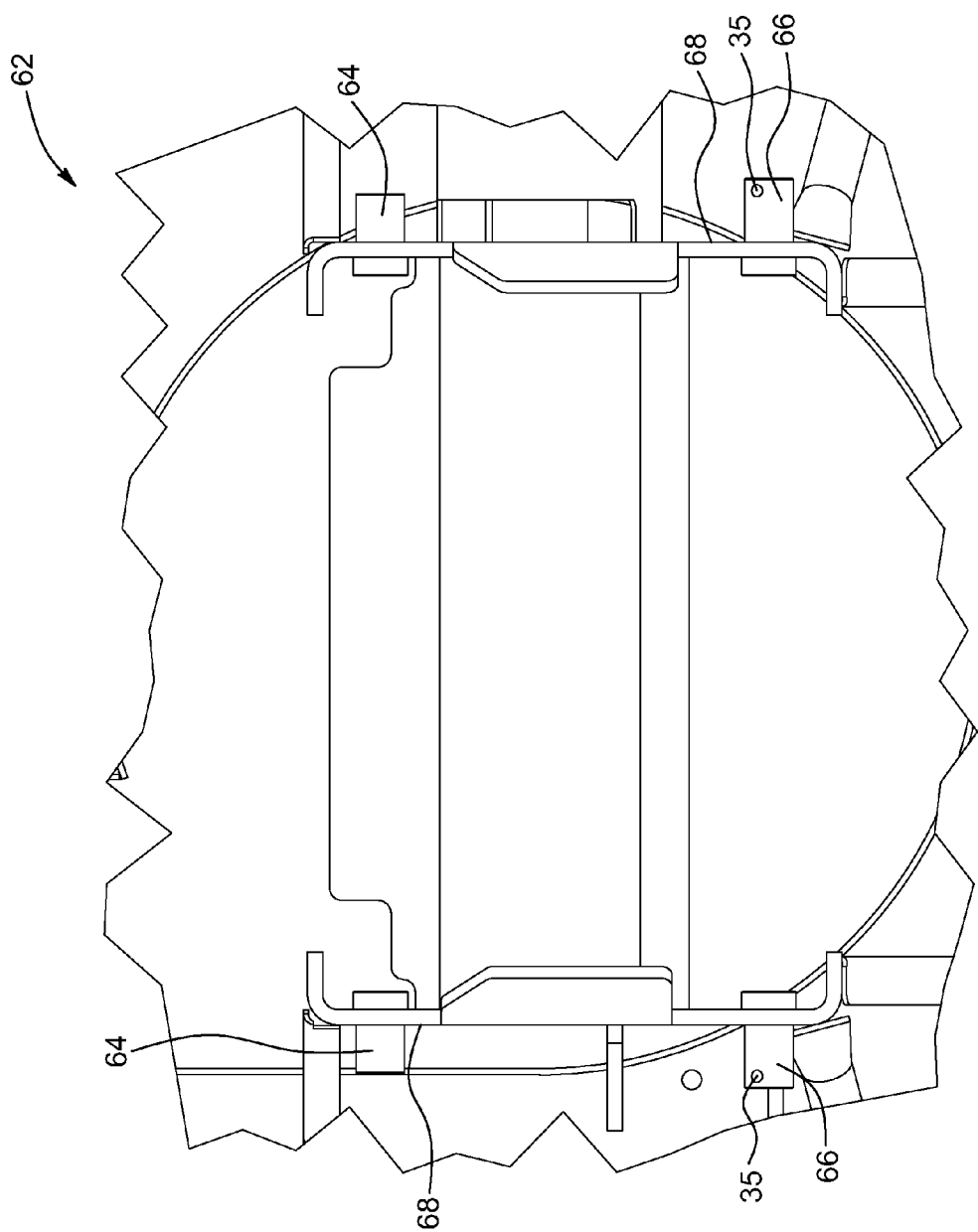
FIG. 11 is a rear view, enlarged, of a section of the accessory of FIG. 10.

Referring now to FIGS. 9 to 11, the accessory attachment component 62 also includes a pair of substantially vertical accessory attachment plates 68 which are spaced apart to fit between the coupler attachment plates 14. The term "substantially vertical" is used herein to identify that the orientation of the accessory attachment plates 68 and/or the coupler attachment plates 14 may vary form a completely vertical orientation. For instance and without being limitative, the accessory attachment plates 68 and/or the coupler attachment plates 14 can be inclined either inwardly or outwardly from the top to the bottom.

A pair of upper male members 64 extends on opposite sides on an upper section of the attachment component 62 and a pair of lower male members 66 extends on opposite sides on a lower section of the attachment component 62. More particularly, the pair of upper male members 64 extends outwardly in opposite directions from their respective accessory attachment plate 68, as better illustrated in FIGS. 10 and 11. Similarly and as also illustrated in FIGS. 10 and 11, the pair of lower male members 66 extends outwardly in opposite directions from the respective accessory attachment plates 68. In the embodiment shown, the upper and lower male members 64, 66 are cylindrical members protruding outwardly from the accessory attachment component 62. However, it is appreciated that the shape and the configuration of the upper and lower male members 64, 66 may vary from the embodiment shown.

The coupler attachment plates 14 are configured in alignment with their respective accessory attachment plates 68 and, more particularly, with the pairs of upper 64 and lower male members 66 of the attachment component 62, for attaching the accessory 60 to the coupler attachment plates 14 at a free end thereof, i.e. the end engageable with the accessory 60 and opposed to the vehicle 80, as it will be described in more details below.

Figure 7:
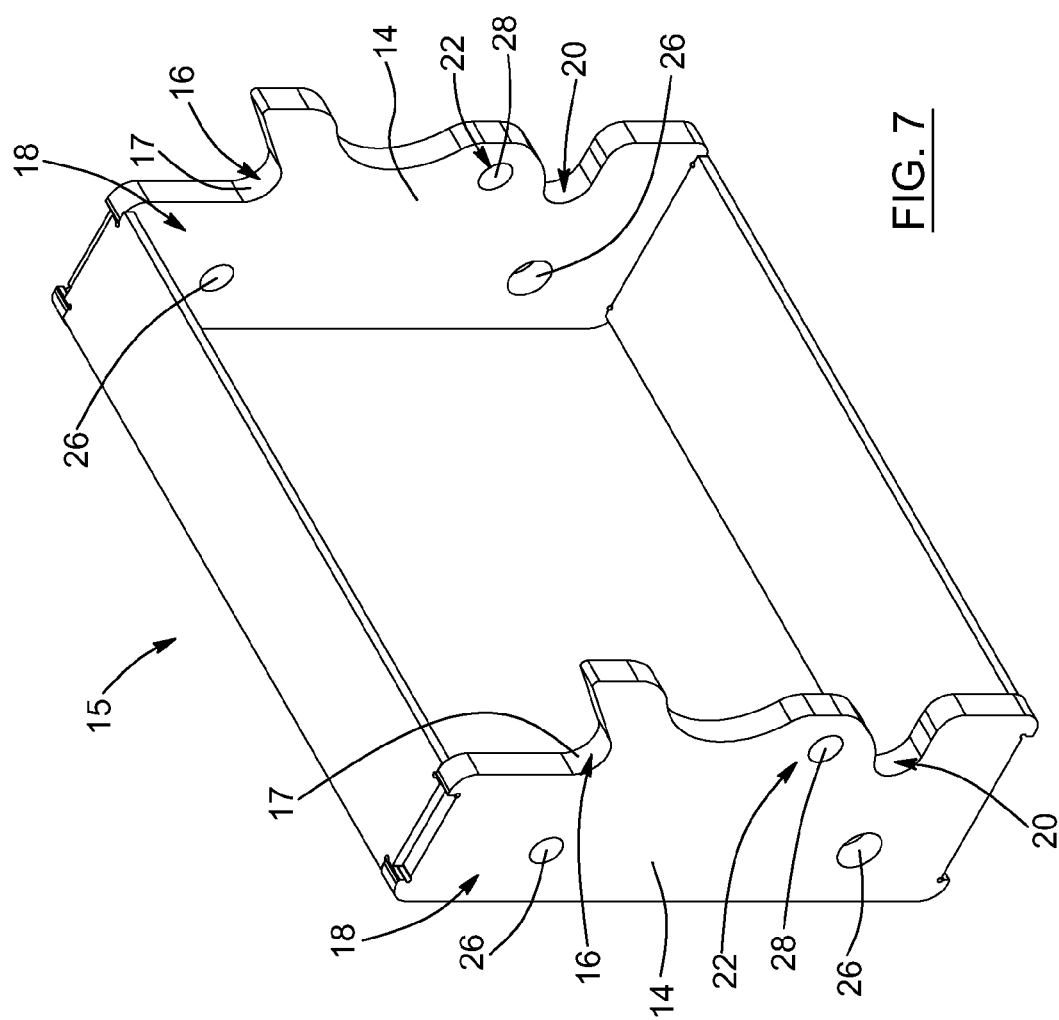
FIG. 7 is a perspective view of a coupler frame shown in FIG. 1 according to an embodiment.
Figure 8:
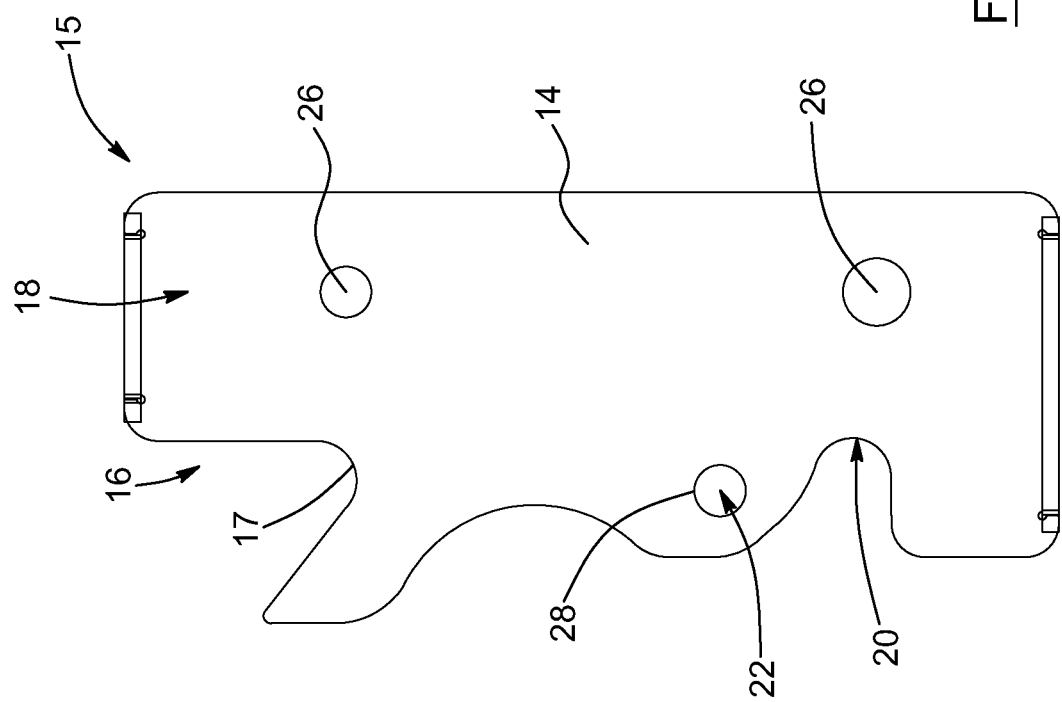
FIG. 8 is a side elevation view of the coupler frame shown in FIG. 7.

As better shown in FIGS. 7 and 8, each one of the coupler attachment plates 14 has a downwardly and rearwardly extending groove 16 defined in an upper section 18 of the coupler attachment plates 14 and being open upwardly for receiving and supporting therein a corresponding one of the pair of upper male members 64 of the attachment component 62 of the accessory 60. Each one of the coupler attachment plates 14 further includes an open end and rearwardly extending elongated slot 20 defined below the groove 16 at the free ends of the coupler attachment plates 14, for sliding therein a corresponding one of the pair of lower male members 66 of the attachment component 62 of the accessory 60, toward a coupled configuration. The grooves 16 and the elongated slots 20 of each one of the coupler attachment plates 14 are in register when the coupler attachment plates 14 are mounted to the frame 15.

In an alternative embodiment, the groove 16 and/or the elongated slot 20 may be provided by a channel-shaped groove and/or slot extending substantially horizontally across the coupler 10.

Furthermore, in an alternative embodiment, the elongated slot 20 can be replaced by an elongated guide member, such as a channel, through which the lower male members can slide into the coupled configuration.

Each one of the coupler attachment plates 14 further includes a locking mechanism 22 for cooperating with each slot 20 to lock the lower male member 66 in the corresponding slot 20, and thereby secure the accessory attachment component 62 to the coupler attachment plates 14 when they are configured in the coupled configuration, as it will be described in more details below.

Figure 4:
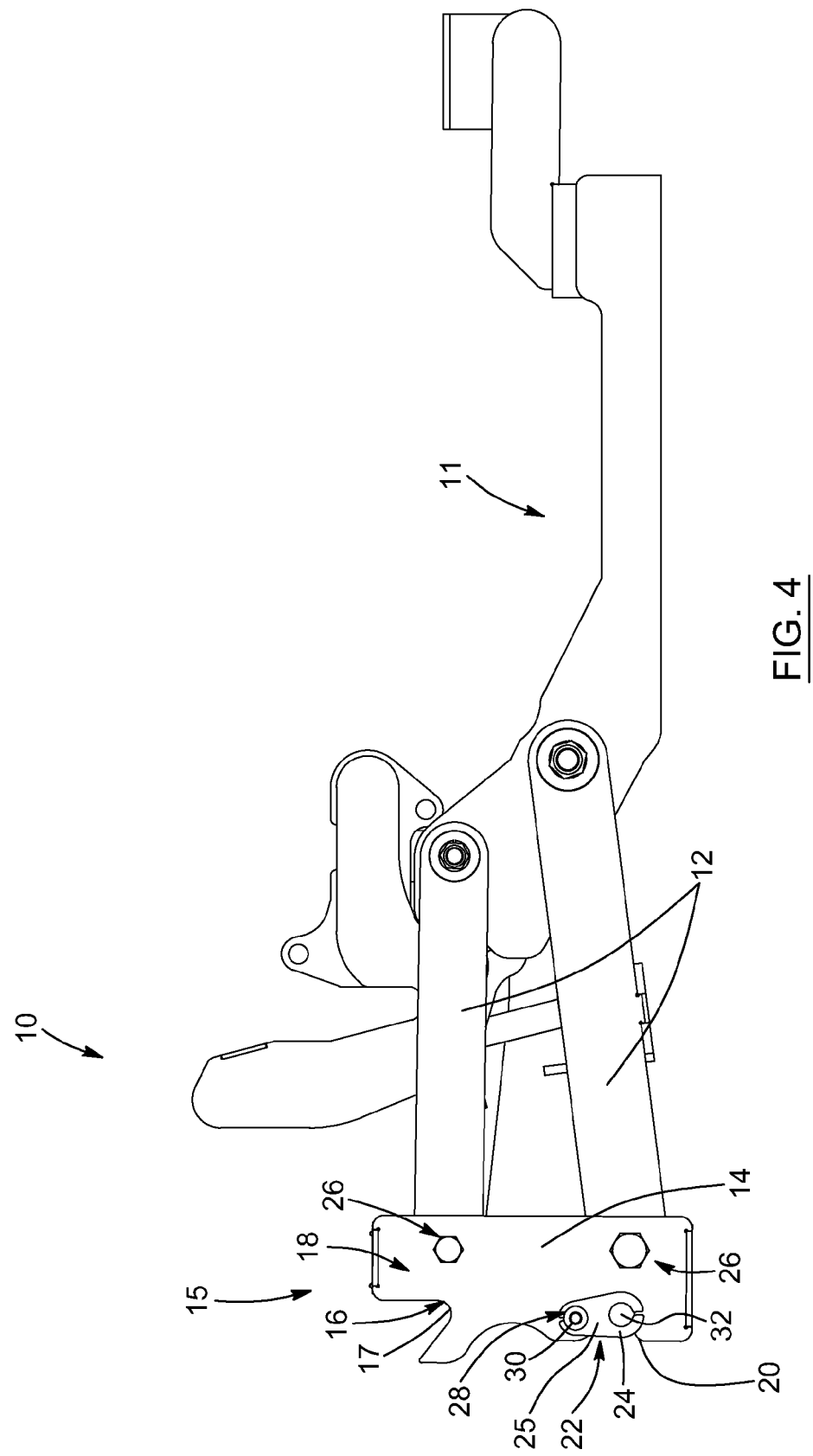
FIG. 4 is a side elevation view of the coupler, according to an embodiment where the coupler is mounted on a vehicle frame.
Figure 5:
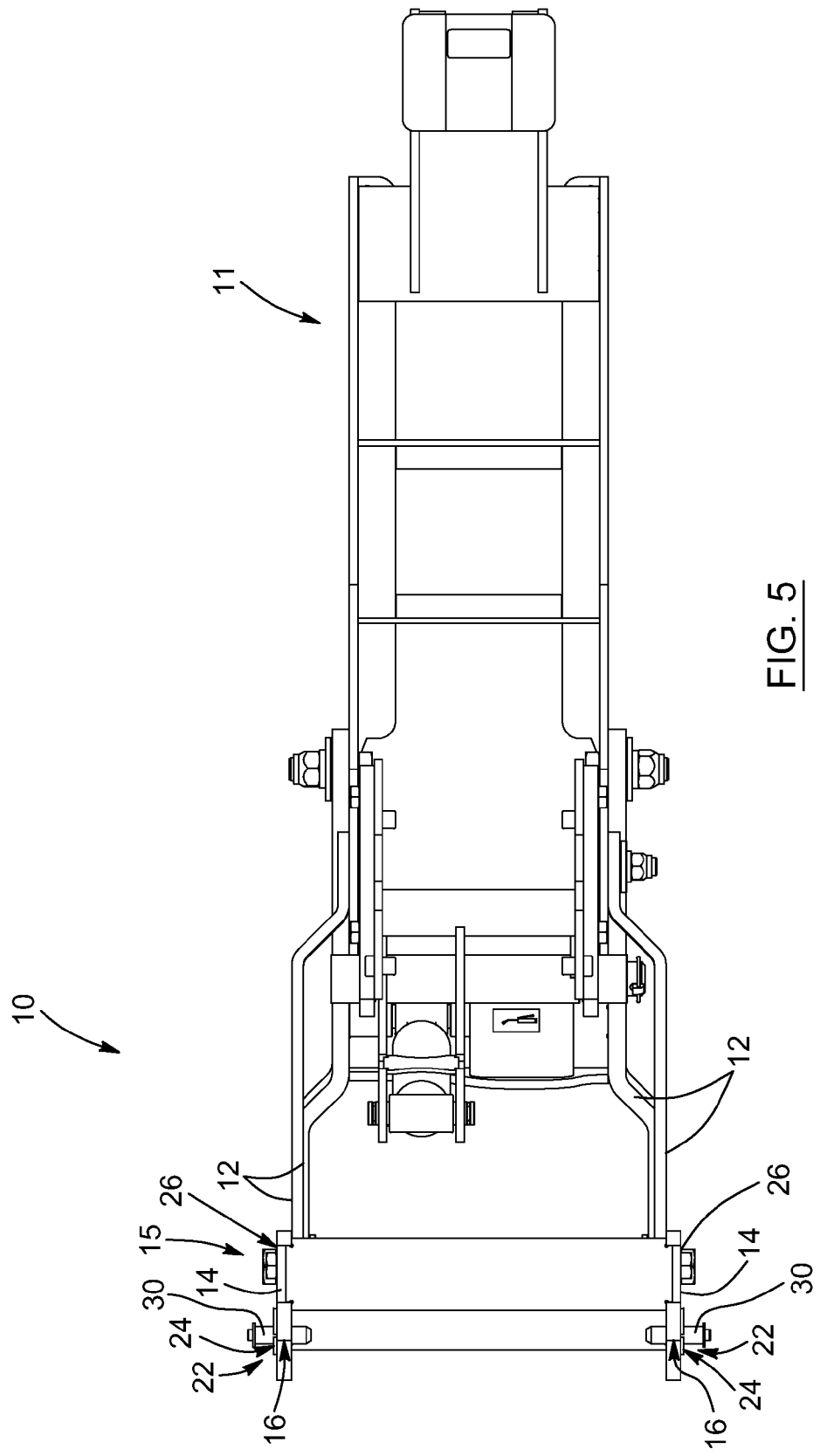
FIG. 5 is a top plan view of the coupler shown in FIG. 4.
Figure 6:
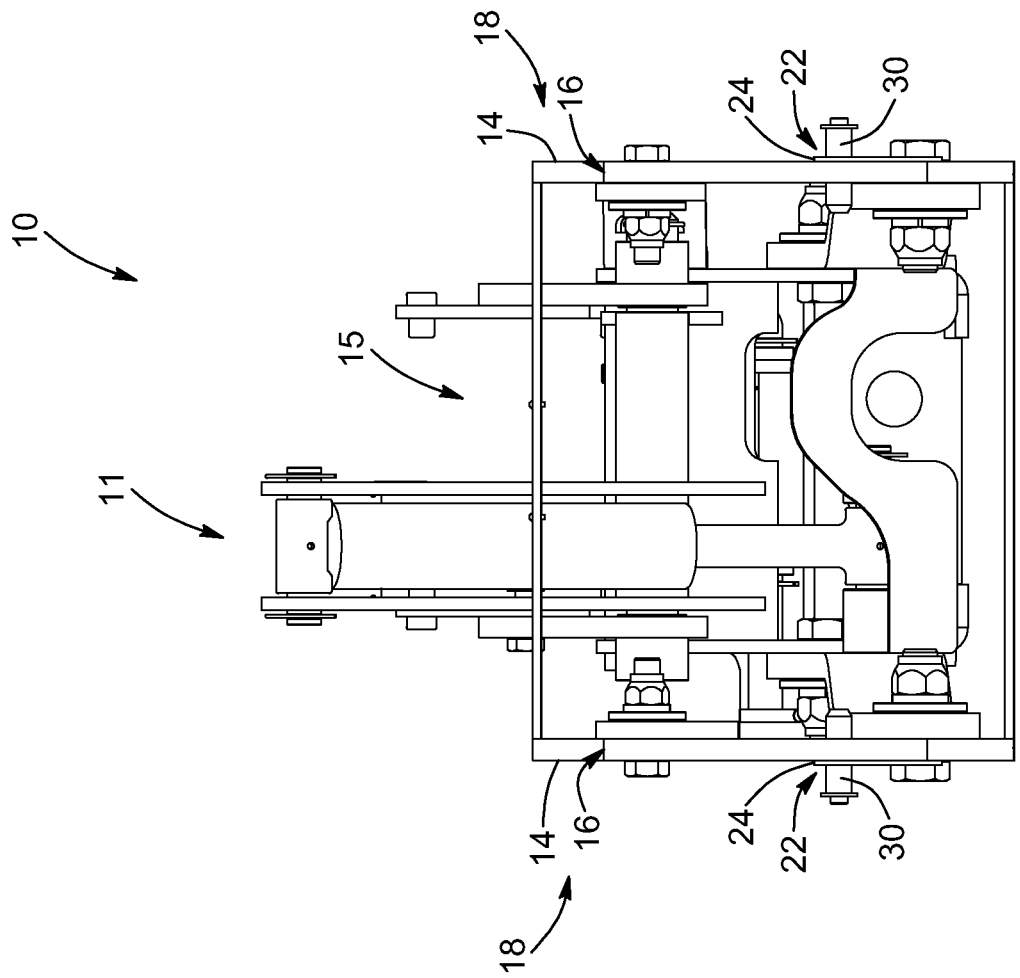
FIG. 6 is a rear view of the coupler shown in FIG. 4.

In the embodiment shown in the drawings and as better illustrated in FIGS. 4 and 7, the grooves 16 are tapered grooves and, more particularly, V-shaped grooves and are open upwardly and toward the free end of the coupler attachment plates 14 in order to facilitate engaging engagement of the upper male members 64 of the accessory 60. More particularly, the closed lower end of each groove 16 forms a nook 17 to support the corresponding upper male member 64 in a restricted stable position, and the upwardly open shape of the groove 16 leads the upper male member 64 by gravity toward this nook 17. As can be seen, the nook 17 is located at a lower position than the entry point (i.e. opening) of the groove 16. The upwardly open configuration and restricted shape of the nook 17 cooperate to further retain the upper male member 64 in the nook 17. It is to be understood that the grooves 16 may be provided in any suitable shape and configuration which would allow them to receive and nest therein the respective upper male members 64. The shape and configuration of the grooves 16 should facilitate insertion of the upper male members 64 in the grooves 16 and have a suitably shaped resting portion, such as nook 17, for example, to support the upper male members 64 in a stable position.

With reference to FIGS. 7 and 8, in the illustrated embodiment the elongated slots 20 are provided in a lower section of each of the coupler attachment plates 14, and oriented substantially horizontally. The term substantially horizontally is used herein in order to identify that in an embodiment the slots may be oriented horizontally, but that in an alternative embodiment (not shown) their orientation may also vary from a completely horizontal orientation. Moreover, in the embodiment shown, the slot 20 is substantially rectilinear. However, in alternative implementations, the slot 20, or any other coupler positioning support, can have another shape such as a curved shape.

In an alternative embodiment (not shown), the positioning support(s) can be a guide member(s), such as an elongated rail(s) or elongated depression(s), in which the accessory positioning connector(s), such as the lower male members 66 are slidably insertable. In other words, the elongated slot 20 is not compulsorily a slot extending through the coupler attachment plates 14 but can be an elongated depression or an elongated slot defined between two rail members, which is configured to guide the lower male members 66 in the coupled configuration. In an embodiment, the guide member has a first open end to engage the lower male member 66 therein and a second closed inner end, which corresponds to the coupled configuration of the coupler 10.

It is to be understood, that in alternative embodiments any one of the upper male members 64 and lower male members 66 may be mounted on any suitable supporting component which may differ from the accessory attachment plates 68. Furthermore, they may extend either inwardly or outwardly from the supporting component such as the accessory attachment plates 68. For example, and without being limitative, the accessory attachment plates 68 may be configured to encase the coupler attachment plates 14. Still according to an alternative embodiment, the upper male members 64 may be provided by a single rod extending between the accessory attachment plates 68 and, optionally, protruding outwardly from each of the accessory attachment plates 68. The same may apply to the lower male members 66 of the attachment component 62 of the accessory 60.

Figure 2:
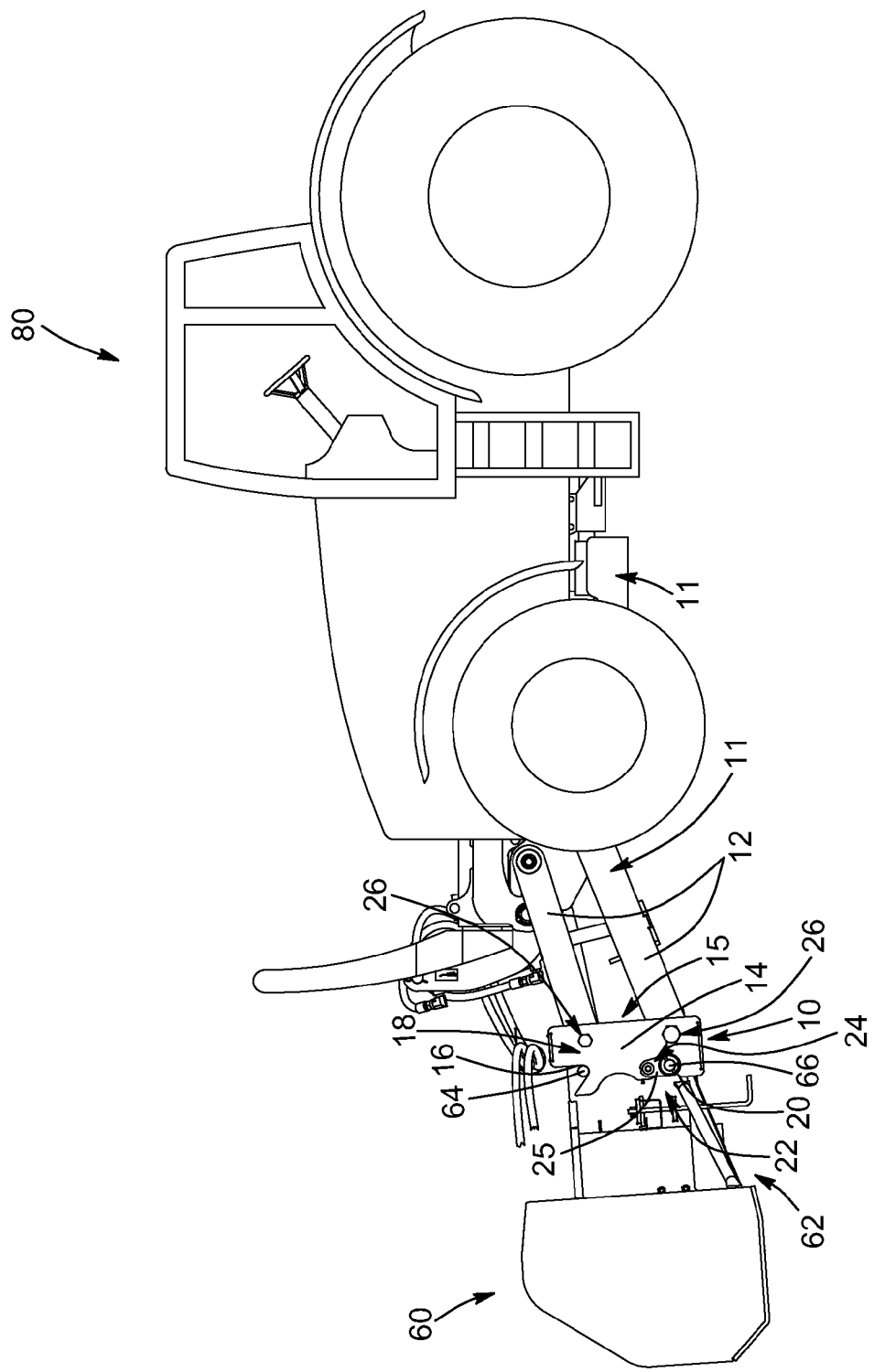
FIG. 2 is another side elevation view of the coupler and accessory combination shown in FIG. 1, the coupler and accessory being shown in a lowered configuration.
Figure 3:
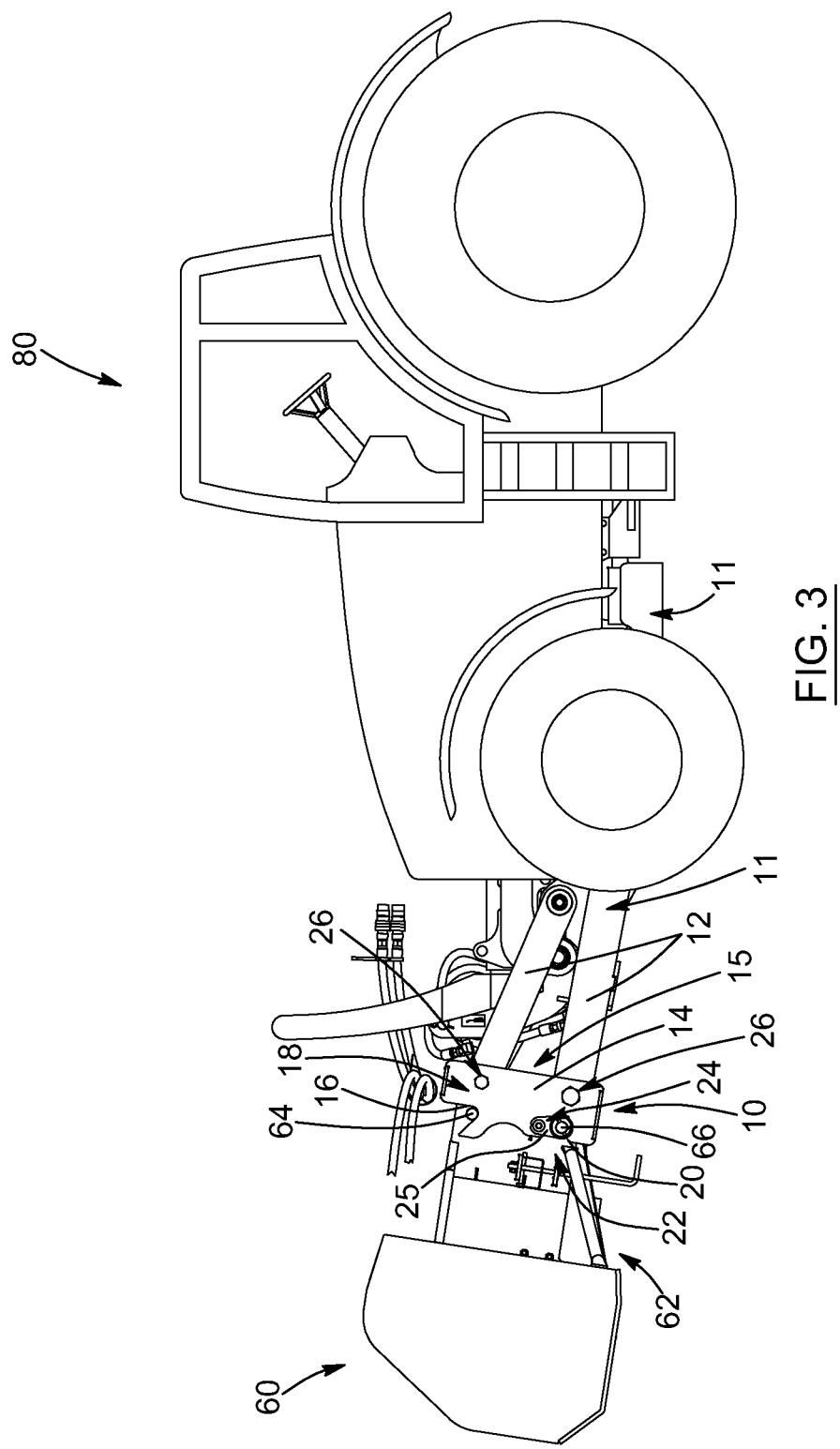
FIG. 3 is another side elevation view of the coupler and accessory combination shown in FIG. 1, the coupler and accessory being shown in a raised configuration.

As better illustrated in FIGS. 1 to 3, in the illustrated embodiment, the mounting assembly 11 includes two pairs of arms 12, vertically spaced-apart from one another. Each pair of arms 12 is associated to a respective one of the coupler attachment plates 14. Each one of the arms 12 has a first end operatively connected to the frame 15 and a second end, opposed to the first end, operatively connectable to the front portion of the vehicle 80.

As can be seen in FIG. 4, with reference also to FIGS. 7 and 8, the first ends of the arms 12 are pivotally connected to their respective coupler attachment plates 14, through a bolt inserted in openings 26. The arms 12 extend at a rear side of the coupler 10, with respect to the accessory 60. As mentioned above, the second end of the arms 12 is operatively connectable to the front portion of the vehicle 80.

The coupler 10 further includes hydraulic hoses (not shown) which are also connectable to the vehicle 80, for controlling the coupler 10 through the arms 12, in order to operate the coupler 10 between a neutral configuration (as exemplified in FIG. 1), a lowered configuration (as exemplified in FIG. 2) and a raised configuration (as exemplified in FIG. 3) and a plurality of intermediate configurations (not shown).

The mounting assembly 11 for securing the coupler 10 to the vehicle 80 can vary from the embodiment shown and described above and may include any structure and/or assembly which is adapted to suitably connect the coupler 10 to the vehicle 80, as can be easily understood by a person skilled in the art.

Figure 12:
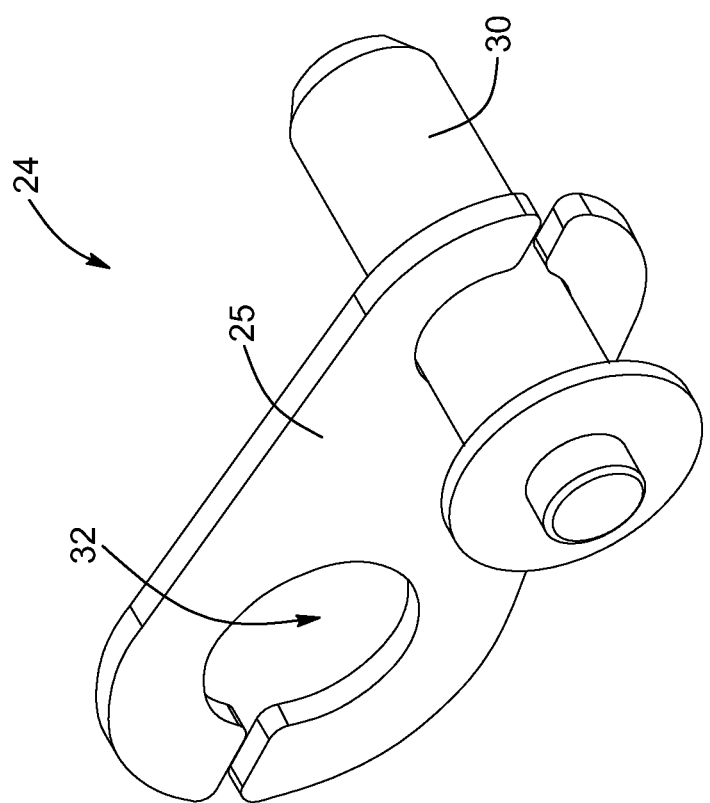
FIG. 12 is a perspective view of a lock according to an embodiment.

With reference to FIGS. 4, 8, and 12, in an embodiment, the locking mechanism 22 includes a coupler lock hole 28 extending through each of the coupler attachment plates 14. The coupler lock hole 28 is located proximal to the respective slots 20. In the embodiment shown, the coupler lock hole 28 is defined above the elongated slots 20. The locking mechanism 22 also includes a complementary lock hole 70 extending through each of the accessory attachment plates 68. The locking mechanism 22 further includes a pair of locks (or "blockers") 24, one for each one of the coupler lock holes 28. More particularly, each one of the locks 24 includes a coupling pin 30 to be inserted through the lock hole 28 of the coupler attachment plate 14 and through the accessory lock hole 70 of the corresponding accessory plate 68, provided the lock holes 28, 70 are suitably aligned (or in register), in order to maintain the accessory attachment plate 68 with respect to the coupler attachment plate 14, and thereby lock the accessory 60 and the coupler 10 in the coupled configuration, i.e. the accessory 60 and the coupler 10 are secured together in a coupled configuration. Each lock 24 further includes a lock body 25 with two through holes. The coupling pin 30 is insertable in a first one of the through holes while a corresponding one of the lower male member 66 is insertable in a second one 32 of the through holes, the positioning connector hole, when the accessory 60 is mounted to the coupler 10. The coupling pin 30 may include a larger end for preventing the lock body 25 to be slidingly removed by this end.

Thus, in the coupled configuration, the lock body 25 is engaged with both the lower male member 66 and the coupling pin 30. Furthermore, each of the lower male member 66 includes a lock pin 34 (see FIG. 9) to be inserted into a pin hole 35 extending through the corresponding lower male member 66 for locking the lock body 25 of the lock 24 against the coupler attachment plates 14.

In an alternative embodiment the coupling pin 30 may be permanently connected to the lock body 25 of the lock 24, for example and without being limitative, by a soldering.

In alternative embodiments, the locking mechanism 22 may be provided by any suitable component(s) which cooperates with the frame 15 and/or the accessory 60 to prevent the lower male members 66 from moving out of their respective open end slots 20.

In the illustrated embodiment, when mounting the accessory 60 onto the coupler 10, the accessory attachment plates 68 are encased between the corresponding coupler attachment plates 14, in order to fittingly engage the accessory attachment plates 68 (i.e. the alignment component) with the frame 15 of the coupler 10. The upper male members 64 are then dropped into the respective tapered grooves 16. The accessory attachment plates 68 form an alignment structure (i.e. "alignment components"). Indeed, the accessory attachment plates 68 are configured to fittingly nest between the coupler attachment plates 14, so as to align the accessory 60 with the coupler 10. Moreover, the upper male members 64 cooperate with the V-shaped grooves 16 in order to further align the accessory 60 with respect to the coupler 10. In the coupled configuration, the upper male members 64 are located in the nook of the tapered end (or V-shaped) grooves 16.

Since the V-shaped grooves 16 are open upwardly, the upper male members 64 are easily dropped therein and are further retained in the grooves 16. The supported upper male members 64 cooperate with the grooves 16 to provide a pivoting axis, allowing the accessory 60 to be pivoted about the upper male members 64. In other words, the grooves 16 form a pivotal support for the accessory 60. As previously mentioned, the upper male members 64 further align the attachment component 62 of the accessory 60 with respect to the coupler 10. Therefore, when the attachment component 62 of the accessory 60 is pivoted about the pivoting axis (i.e. about the upper male members 64), the lower male members 66 are already suitably aligned with the open end of the elongated slots 20, so as to slide into the respective slots 20 of the coupler 10 toward the coupled configuration.

Thus, the coupler attachment plates 14 and the accessory attachment plates 68 form part of the alignment structures of the coupler 10 and accessory 60, respectively. The grooves 16 also provide an alignment structure for the coupler 10, and the upper male members 64 provide a further alignment structure for the attachment component 62 of the accessory 60. The upper male members 64 provide pivotal connectors and cooperate with the grooves 16 to pivotally connect the accessory's attachment component 62 to the frame 15 of the coupler 10. The grooves 16 provide a pivotal support to receive the respective upper male members 64, and the slots 20 provide a positioning support or "guide" for leading the respective lower male members 66 of the accessory toward the coupled configuration. The lower male members 66 form a positioning connector. Indeed, the lower male members 66 are pivoted about the pivotally supported upper male members 64 and slide into the elongated slots 20. In the embodiment shown, the lower male member 66 is slid into the elongated slots 20 to the innermost closed end of the slot 20, so as to place the attachment component 62 into the coupled configuration. In the embodiment shown, the combination of the upper male members 64 and the lower male members 66 respectively engaged with the tapered grooves 16 and the elongated slot 20 secures the accessory 60 in a single coupled configuration with the coupler 10. In this coupled configuration, the coupler lock hole 28 of each plate 14 is aligned in register with the accessory lock hole 70 of the corresponding plate 68 of the accessory 60 (see FIG. 9).

In order to lock each of the lower male members 66 in the respective slots 20, the lock 24 is positioned over a respective one of the plates 14, to align the pin 30 with the lock hole 28 and the positioning connector hole 32 with the lower male member 66. The lock 24 is then fastened to the plate 14 by inserting the coupling pin 30 through lock holes 28, 70 of the coupler 10 and the attachment component 62 of the accessory 60. The lock pin 34 is then inserted into the pin hole 35 of the lower male member 66 to prevent the lock 24 from slipping out of the lower male member 66 of the attachment component 62 of the accessory 60.

Numerous modifications could be made to the above-described coupler, without departing from the scope of the present invention. The above-described embodiments are considered in all respect only as illustrative and not restrictive, and the present application is intended to cover any adaptations or variations thereof, as apparent to a person skilled in the art.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the scope of the invention as defined in the appended claims.

The invention claimed is:

1. A vehicle comprising:
an accessory coupler operatively mounted to one of the vehicle and an accessory, the accessory coupler including two spaced-apart coupler attachment plates having a free end, each one of the coupler attachment plates having an upper groove with an open end provided at the free end of the respective one of the coupler attachment plates and an elongated guide member comprising an elongated slot extending below the respective one of the upper grooves, the upper grooves being tapered and downwardly extending;
an accessory attachment component operatively mounted to the other one of the vehicle and the accessory, the accessory attachment component being detachably engageable with the accessory coupler and having at least one upper male member and at least one lower male member respectively engageable in the upper grooves and the elongated guide members to configure the accessory attachment component and the accessory coupler in a coupled configuration, the at least one lower male member being engageable in the elongated guide member and slidable therein toward the coupled configuration; and a locking mechanism for securing the accessory attachment component and the accessory coupler together when the accessory attachment component is engaged with the accessory coupler in the coupled configuration.

2. The vehicle as claimed in claim 1, wherein the accessory coupler is operatively mounted at an end of the vehicle and the accessory attachment component is operatively mounted to the accessory.

3. The vehicle as claimed in claim 2, wherein each one of the elongated slots comprises a first open end provided at a free end of the coupler attachment plates and a second closed end corresponding to the coupled configuration.

4. A coupler for coupling an accessory to a vehicle, the accessory comprising an attachment component to be mounted to the coupler, the attachment component comprising an accessory alignment structure, an accessory pivotal connector, and an accessory positioning connector, the coupler comprising:

a mounting assembly securable to the vehicle; and a coupler frame operatively connected to the mounting assembly and having a free end to receive the accessory, the coupler frame comprising:

a coupler alignment structure for cooperating with the accessory alignment structure of the attachment component, so as to align the accessory with respect to the coupler frame;

a coupler pivotal support formed therein configured to receive and pivotally support the accessory pivotal connector of the attachment component;

a coupler positioning support formed therein configured to receive the accessory positioning connector of the attachment component and guide the accessory positioning connector toward a coupled configuration, wherein the accessory positioning connector is aligned with the coupler positioning support when the accessory pivotal connector is received in the coupler pivotal support; and a locking mechanism engageable with the attachment component of the accessory and the coupler frame to lock the accessory and the coupler frame in the coupled configuration.

5. The coupler of claim 4, wherein the coupler positioning support comprises an elongated slot extending below the coupler pivotal support.

6. The coupler of claim 5, wherein the elongated slot comprises a first open end provided at the free end of the coupler frame and a second closed end corresponding to the coupled configuration.

7. The coupler of claim 4, wherein the locking mechanism is engageable with the accessory positioning connector.

8. The coupler of claim 4, wherein the locking mechanism comprises through holes defined in the attachment component of the accessory and the coupler frame, the through holes being aligned when the accessory and the coupler frame are configured in the coupled configuration, and at least one pin engageable within the aligned through holes.

9. The coupler of claim 4, wherein the accessory pivotal connector comprises male members extending on opposite sides of the attachment component and the coupler pivotal support comprises at least one tapered groove provided in an upper section and at the free end of the coupler frame, the at least one tapered groove being open upwardly for receiving and supporting therein the male members.

10. The coupler of claim 9, wherein the at least one tapered groove extends downwardly and rearwardly from the free end of the coupler frame and the accessory pivotal connector is located in a closed lower end of the at least one tapered groove in the coupled configuration.

11. The coupler of claim 4, wherein the accessory positioning connector comprises male members extending on opposite sides of the attachment component and the male members are slidingly engageable in the coupler positioning support from the free end of the coupler frame toward a closed inner end of the coupler positioning support.

12. The coupler of claim 4, wherein the coupler alignment structure comprises spaced-apart coupler attachment plates and the accessory alignment structure comprises spaced-apart accessory attachment plates, and at least one of the coupler attachment plates and the accessory attachment plates being configured to encase the other one of the coupler attachment plates and the accessory attachment plates.

13. The coupler of claim 12, wherein the coupler attachment plates are configured to encase the accessory attachment plates and each one of the accessory pivotal connector and the accessory positioning connector comprises male members extending outwardly of the accessory attachment plates.

14. The coupler of claim 12, wherein the locking mechanism comprises:

a coupler lock hole on each one of the coupler attachment plates, each one of the coupler lock holes being located proximal to the coupler positioning support;

an accessory lock hole on each one of the accessory attachment plates, each one of the accessory lock holes being in alignment with a respective one of the coupler lock holes in the coupled configuration;

locks for locking each one of the coupler attachment plates to a respective one of the accessory attachment plates, each one of the locks comprising:

a lock body;

a coupling pin to be inserted in the aligned coupler lock hole and accessory lock hole, the pin being connected to the lock body;

a positioning connector hole formed in the lock body for receiving therein a respective one of the accessory positioning connectors, when the accessory is mounted to the coupler; and a lock pin to be inserted into a pin hole formed in the respective one of the corresponding accessory positioning connectors for locking the lock body against the coupler attachment plates.

15. A coupler for securing an accessory to a motorized vehicle, the coupler comprising:

an accessory attachment component securable to one of the accessory and the vehicle and including a first accessory connector and a second accessory connector comprising male members extending on opposite sides of the accessory attachment component and;

a coupler frame securable to the other one of the vehicle and the accessory and having a first coupler support defined in the coupler frame configured to receive and support the first accessory connector and a second coupler support configured to receive and guide the second accessory connector in a coupled configuration, wherein the second accessory connector is aligned with the second coupler support when the first accessory connector is received in the first coupler support and slidable toward the coupled configuration, the male members being slidingly engageable in the second coupler support from a free end of the coupler frame toward an inner end of the second coupler support; and a locking mechanism engageable with the accessory attachment component and the coupler frame to lock the accessory attachment component and the coupler frame in the coupled configuration.

16. The coupler as claimed in claim 15, wherein the second coupler support comprises an elongated slot extending below the first coupler support and the elongated slot comprises a first open end provided at a free end of the coupler frame and a second closed end corresponding to the coupled configuration.

17. The coupler of claim 15, wherein the locking mechanism is engageable with the second accessory connector.

18. The coupler of claim 15, wherein the locking mechanism comprises through holes defined in the accessory attachment component and the coupler frame, the through holes being aligned when the accessory attachment component and the coupler frame are configured in the coupled configuration, and at least one pin engageable within the aligned through holes.

19. The coupler of claim 15, wherein the first accessory connector comprises male members extending on opposite sides of the accessory attachment component and the first coupler support comprises at least one tapered groove provided in an upper section and a free end of the coupler frame, the at least one tapered groove being open upwardly for receiving and supporting therein the male members.

20. The coupler of claim 15, wherein the coupler frame comprises spaced-apart coupler attachment plates and the accessory attachment component comprises spaced-apart accessory attachment plates, and at least one of the coupler attachment plates and the accessory attachment plates being configured to encase the other one of the coupler attachment plates and the accessory attachment plates.

21. A vehicle comprising:

an accessory coupler operatively mounted to one of the vehicle and an accessory, the accessory coupler including two spaced-apart coupler attachment plates, each one of the coupler attachment plates having an upper groove with an open end and an elongated guide member;

an accessory attachment component operatively mounted to the other one of the vehicle and the accessory, the accessory attachment component being detachably engageable with the accessory coupler and having at least one upper male member and at least one lower male member respectively engageable in the upper grooves and the elongated guide members to configure the accessory attachment component and the accessory coupler in a coupled configuration, the at least one lower male member being engageable in the elongated guide member and slidable therein toward the coupled configuration; and a locking mechanism for securing the accessory attachment component and the accessory coupler together when the accessory attachment component is engaged with the accessory coupler in the coupled configuration, the locking mechanism being engageable with the at least one lower male member.

22. A vehicle comprising:

an accessory coupler operatively mounted to one of the vehicle and an accessory, the accessory coupler including two spaced-apart coupler attachment plates, each one of the coupler attachment plates having an upper groove with an open end and an elongated guide member;

an accessory attachment component operatively mounted to the other one of the vehicle and the accessory, the accessory attachment component being detachably engageable with the accessory coupler and having at least one upper male member and at least one lower male member respectively engageable in the upper grooves and the elongated guide members to configure the accessory attachment component and the accessory coupler in a coupled configuration, the at least one lower male member being engageable in the elongated guide member and slidable therein toward the coupled configuration; and a locking mechanism for securing the accessory attachment component and the accessory coupler together when the accessory attachment component is engaged with the accessory coupler in the coupled configuration, the locking mechanism comprising through holes defined in the accessory attachment component and the coupler attachment plates, the through holes being aligned when the accessory attachment component and the coupler attachment plates are configured in the coupled configuration, and at least one pin engageable within the aligned through holes.

23. A coupler for securing an accessory to a motorized vehicle, the coupler comprising:

an accessory attachment component securable to one of the accessory and the vehicle and including a first accessory connector and a second accessory connector;

a coupler frame securable to the other one of the vehicle and the accessory and having a first coupler support defined in the coupler frame configured to receive and support the first accessory connector and a second coupler support configured to receive and guide the second accessory connector in a coupled configuration, the second coupler support comprising an elongated slot extending below the first coupler support and having a first open end provided at a free end of the coupler frame and a second end corresponding to the coupled configuration, wherein the second accessory connector is aligned with the second coupler support when the first accessory connector is received in the first coupler support and slidable toward the coupled configuration; and a locking mechanism engageable with the accessory attachment component and the coupler frame to lock the accessory attachment component and the coupler frame in the coupled configuration.

24. The coupler of claim 23, wherein the accessory attachment component is securable to the accessory and the coupler frame is securable to the vehicle and wherein the first accessory connector comprises an accessory pivotal connector, the second accessory connector comprises an accessory positioning connector, the first coupler support comprises a coupler pivotal support configured to pivotally support the first accessory connector and the second coupler support comprises a coupler positioning support.

25. A coupler for securing an accessory to a motorized vehicle, the coupler comprising:

an accessory attachment component securable to one of the accessory and the vehicle and including a first accessory connector and a second accessory connector, wherein the first accessory connector comprises male members extending on opposite sides of the accessory attachment component;

a coupler frame securable to the other one of the vehicle and the accessory and having a first coupler support defined in the coupler frame configured to receive and support the first accessory connector and a second coupler support configured to receive and guide the second accessory connector in a coupled configuration, the first coupler support comprising at least one tapered groove provided in an upper section and a free end of the coupler frame, the at least one tapered groove being open upwardly for receiving and supporting therein the male members, wherein the second accessory connector is aligned with the second coupler support when the first accessory connector is received in the first coupler support and slidable toward the coupled configuration; and a locking mechanism engageable with the accessory attachment component and the coupler frame to lock the accessory attachment component and the coupler frame in the coupled configuration.

26. The coupler of claim 25, wherein the at least one tapered groove extends downwardly and rearwardly from the free end of the coupler frame and the first accessory connector is located in a closed lower end of the at least one tapered groove in the coupled configuration.

\* \* \* \* \*